G. P. HERRICK.
COUNTERBALANCED BEARING FOR ROTARY JOURNALS.
APPLICATION FILED NOV. 24, 1908.
928,126.
Patented July 13, 1909.
2 SHEETS—SHEET 1.
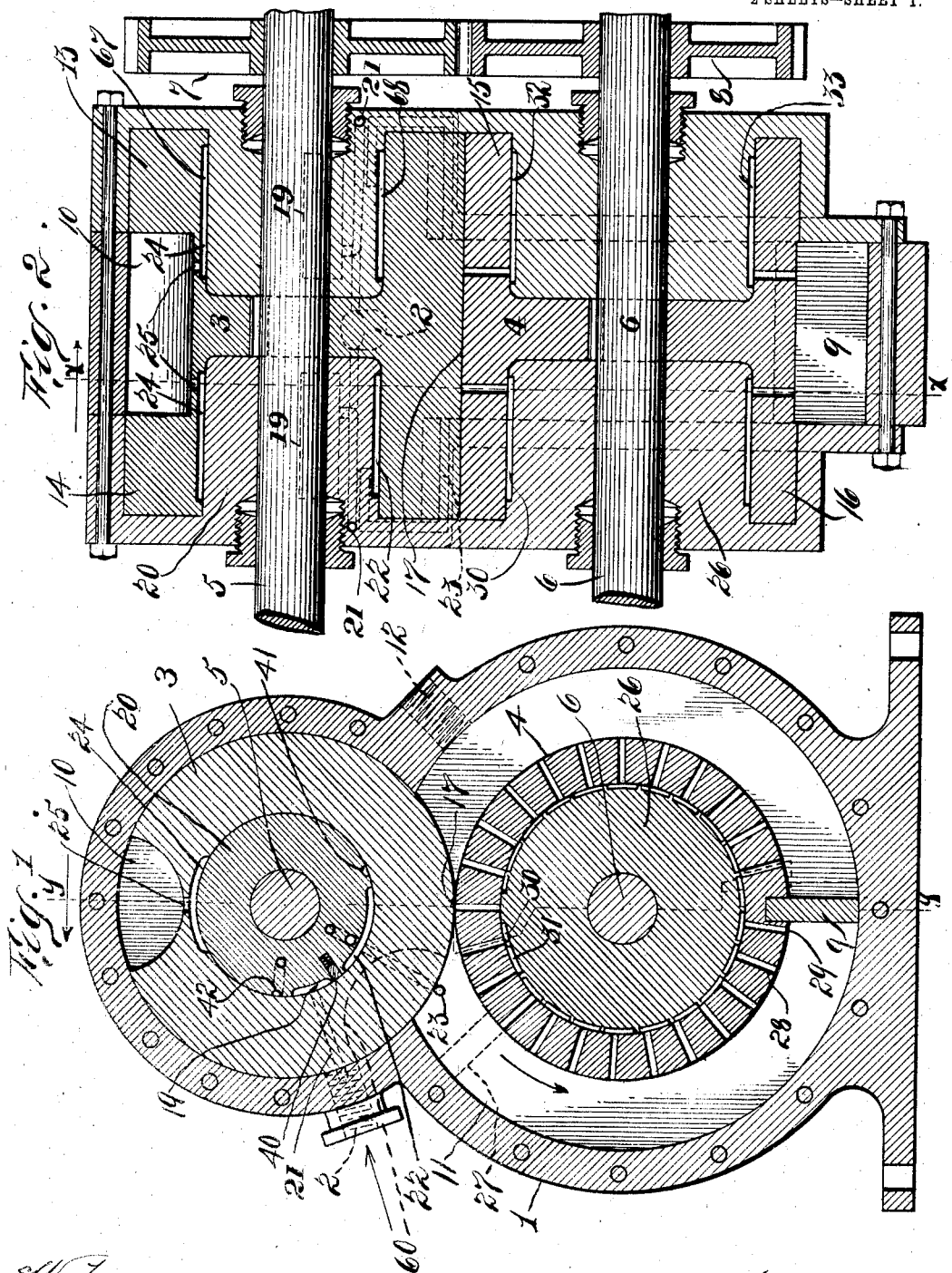
Witnesses:
E. A. Jarvis
J. J. McCarthy
Inventor
Gerardus Post Herrick
By Forter, Freeman, Watson & Coit
Attorneys.

G. P. HERRICK.
COUNTERBALANCED BEARING FOR ROTARY JOURNALS.
APPLICATION FILED NOV. 24, 1908.
928,126.
Patented July 13, 1909.
2 SHEETS—SHEET 2.
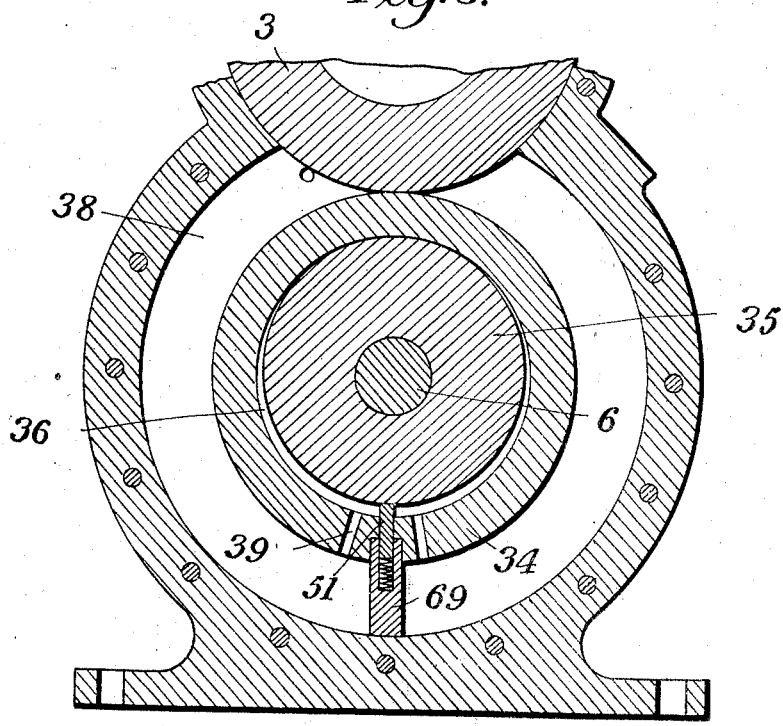
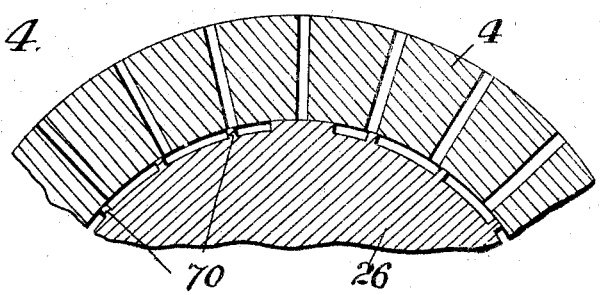
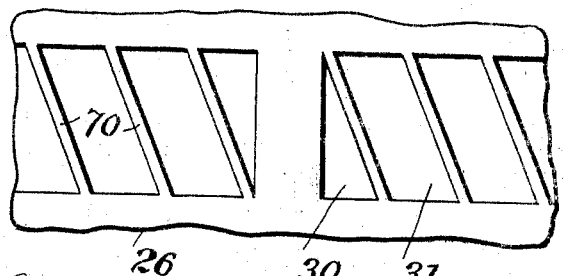

UNITED STATES PATENT OFFICE.

GERARDUS POST HERRICK, OF NEW YORK, N. Y.

COUNTERBALANCED BEARING FOR ROTARY JOURNALS.

No. 928,126.　　　　Specification of Letters Patent.　　　Patented July 13, 1909.

Application filed November 24, 1908. Serial No. 464,322.

*To all whom it may concern:*

Be it known that I, GERARDUS POST HERRICK, a citizen of the United States, and resident of New York, in the county and State of New York, have invented certain new and useful Improvements in Counterbalanced Bearings for Rotary Journals, of which the following is a specification.

My invention relates to a fluid-counterbalancing journal, and my object is to provide a construction which will counterbalance, by means of a fluid under pressure, a load which would otherwise be exerted upon a frictional radial bearing, in order to obviate to a great extent the friction which would otherwise take place between the fixed and rotatable members of said bearing.

While my invention may be applicable in a great variety of ways, it was primarily designed to obviate, to a great extent, the friction between the rotatable and fixed members of a radial bearing in which a load is exerted upon one side of the rotatable member, and which in some cases varies both in radial direction and amount.

In the drawings: Figure 1 represents in vertical section one form of a rotary engine embodying my invention, the section being taken on line X—X of Fig. 2; Fig. 2 is a transverse vertical section on the line Y—Y of Fig. 1; Fig. 3 shows a different application of my invention; and Figs. 4 and 5 show details of construction.

In a rotary engine, that load which is the result of the pressure which is perpendicular to the axis of rotation on the rotatable member, exerted by the steam which also rotates said member, varies both in direction and amount as the said member rotates. Such radial load has in most rotary engines resulted in an excessive loss of power due to mechanical friction between the bearings, resulting in impairing the durability and efficiency in horse-power delivered by the engine. By my invention I have been enabled to counterbalance the greater part of the resultant load and so obviate the defects of such engines due to the excessive loss from friction. I prefer to counterbalance the load by means of the pressure of the fluid which exerts said load, so as to substitute to a great extent a fluid bearing for a mechanical frictional bearing, and to also cause the rotatable member on which the load is exerted to automatically vary the direction and amount of the counterbalancing pressure, but the practical use of my invention has shown that this is not necessary in all cases.

For the purpose of illustrating one application of my invention I have shown it in Figs. 1 to 5 in connection with a particular type of rotary engine, but it has no necessary limitation to such type and is applicable to other structures where it is desired to avoid the losses resulting from loads acting radially—either constant or variable—to thrust one member axially toward another.

Referring to Fig. 1, 1 indicates the casing of the engine provided with an entrance port 2 for the fluid under pressure, such as steam. 3 and 4 are rotatable elements or members fixed to their respective shafts 5 and 6, and may be geared together as indicated at 7 and 8 in Fig. 2, so as to revolve in unison. The rotatable member 4 is provided with a projection 9 extending outwardly from the axis of rotation and which I call a piston, and the rotatable member 3 with a cut-away portion 10 to receive the piston and, when in the proper position, to connect the entrance port 2 with the chamber 11 so as to admit steam behind the piston to drive the same and rotate the moving elements. 12 is an exhaust port connecting with the space between the casing and rotatable member 4 ahead of the piston. It will be obvious that as the member 4 rotates in the direction of the arrow, the piston will enter the recess 10, and, as soon as the recess connects with port 2, steam will be admitted behind the piston and soon thereafter be cut off, and the steam in chamber 11 behind the piston will then continue to rotate the same, and such steam be exhausted when the piston passes the exhaust port 12.

In the particular embodiment of my invention shown in Figs. 1 and 2, the rotating members are provided with annular extensions indicated by 13 to 16, which fit closely in corresponding annular recesses surrounding the sides of the fixed members 20 and 26 around which they revolve.

It will be obvious that the steam which is in chamber 11 behind the piston exerts a heavy radial load upon the rotatable member 4 after the steam is admitted, and as this member rotates the resultant load will vary both in radial direction and in amount. Other things being equal, the direction of the resultant load will be a perpendicular (passing through the axis of rotation) to a chord drawn from the point indicated by 17 to the point on the rotatable member 4 indicated by 18, where the rear face of the piston meets the surface of the member 4. It will be obvious that such perpendicular would change its direction as the member rotates and that this perpendicular or resultant would advance in the direction of rotation at a less speed than (in the present embodiment at one-half the speed of) the speed of the rotatable member 4. For example, when the rotatable member has advanced 90 degrees, the resultant will have advanced one-half that distance, and when the rotatable member has advanced 180 degrees, the resultant will have advanced 90 degrees, etc. The load will obviously vary in amount due to the expansion of the steam and the increase of the area of the rotatable member which is exposed to the steam, and the resultant frictional load would correspond to the varying length of the before-mentioned chord. This load would therefore exert upon the bearing of the rotatable member 4 a radial load which varies both in direction and amount, unless said load is counter-balanced in some way. The pressure of the steam passing through the entrance port 2 also obviously exerts a fluid pressure upon the outer face of the member 3 which is constant in direction, and practically constant in amount. The radial load exerted by the steam in chamber 11 upon the member 3 will obviously be constant in direction, but will vary in amount due to the variation of the pressure of the fluid in chamber 11. As there is steam in chamber 10 during the greater part of the revolution of member 3, this steam will obviously exert a radial load upon the member 3 which varies both in direction and amount on account of its rotation and the reduction of the steam pressure. These loads have heretofore proved practically insurmountable obstacles to the economic use of different forms of rotary motors as they create great friction and consequent loss of durability and efficiency of the engine. By my invention, however, I have been enabled to effectually counter-balance these loads and have been enabled to practically substitute for a mechanical frictional bearing a fluid-pressure bearing for the moving elements. This I have accomplished by introducing a fluid under pressure such for example as steam, compressed air or other gas, to act radially between the rotatable member and a member relatively fixed with relation thereto (such as the bearing of the rotatable member) so as to exert upon said rotatable member a fluid-pressure which is opposed to the direction of the radial load whether this load is constant in direction or varies, and whether it is constant in amount or not. In the embodiment shown in the drawings I have preferred to accomplish this by providing one or more chambers between the bearing faces of the rotatable and fixed members, said chamber or chambers being so located, and the fluid being so introduced, as to automatically and effectively counterbalance the load. In such constructions as shown in Fig. 1 such chamber may be in the face of the rotatable member or in the face of the fixed member, depending upon what condition is present. In most cases, however, I prefer to locate this chamber or chambers in the face of the fixed member as shown. 19 is one of such chambers in the face of the fixed member 20 opposite the port 2. It will be obvious that if steam under boiler pressure is admitted to this chamber 19, it will oppose the radial load upon member 3 which is exerted at the entrance port 2. I prefer to provide a passageway 21 through the fixed member 20 and between the source of supply 2 and the chamber 19, so that steam may readily pass thereto to counterbalance this load, the area of the chamber 19 being properly proportioned to this end. In the construction shown the chamber 19 is divided into two sections on opposite sides of the central web of the member 3. 22 represents another chamber or chambers in the fixed member 20 opposite the upper end of chamber 11, and 23 is a passageway in the fixed member and connecting said chambers 11 and 22 so that the steam from chamber 11 will enter chamber 22. It will be obvious that the steam in chamber 22 will vary in pressure as the steam in chamber 11 varies, and therefore will counterbalance the varying radial load at this point. This load is constant in direction.

In order to counterbalance the load exerted by the steam in the recess 10, I have provided a chamber 24 which in this case is in the face of the rotatable member and which will therefore rotate with the recess 10. The passageway 25 connects these two chambers.

In order to counterbalance the radial load on the rotating member 4, I have preferably provided a series of chambers 30 31 located in the periphery of the fixed member 26 separated by partitions 70 which are preferably arranged diagonally. It will be obvious that as the parts rotate the piston will pass exhaust port 12 and there will then be practically no steam load upon the member 4, but as the piston enters recess 10 and moves farther on to the position indicated by dotted lines at 27 (where recess 10 has just established communication between the inlet port and the chamber behind the piston) steam will immediately be admitted through the passageways 28, 29 to the chambers 30 31 in the fixed member 26, and the pressure of steam will therefore be exerted in those chambers in opposition to the radial load exerted by the steam in the chamber 11 behind the piston. As seen in Fig. 2, I preferably have a series of such counterbalancing chambers in the periphery of each hub of the fixed member. As the combined area of the chambers to which the steam is admitted from the chamber 11, is substantially equal to the effective exterior area of the rotatable member 4, which is behind the piston at any given time, the radial load at any given time will be substantially counterbalanced. As the member 4 continues to rotate the piston will move from the dotted line position toward the position shown in full lines, and as the rotatable member is provided with a succession of passageways through it, which communicate successively with the counterbalancing chambers, the advance (in the direction of rotation) of the resultant steam pressure load will be automatically counterbalanced by the similarly advancing resultant counterbalancing steam pressure. It will be observed that in the embodiment shown in the drawings the resultant of the load on the outside of the rotatable member and the resultant of the counterbalancing pressure will both advance in the direction of the rotation and at a less speed than (in the present embodiment at one-half the speed of) the speed of the rotatable member. In the embodiment shown the supply of steam is cut off when the piston is moved a short distance from its dotted line position, and thereafter the steam is used expansively, reducing in pressure as the piston progresses, and as the counterbalancing chambers are successively opened to the space behind the piston and the pressure in the chambers is therefore equal, the varying direction and amount of the radial load is automatically counterbalanced.

It will be observed that when steam is first admitted to the chamber formed behind the piston, steam pressure is exerted on such an area of said rotatable member as results in a load toward the bearing, and that as the steam enters through the passageways into the counterbalancing space the pressure is also exerted between the rotatable member and the bearing on such an area of the rotatable member as results in a pressure in opposition to said load, and that as the rotatable member and piston advance both said areas will be simultaneously increased because the outside area exposed to the steam will be increased and the area of the rotatable member exposed to the internal counterbalancing pressure will also be increased. In order to accomplish this increase of area exposed to the counterbalancing pressure I prefer to provide a succession of chambers as shown, but this may not be necessary in all cases. As for example, only to have them part way around, or as in Fig. 3, for example, which shows a form of rotatable member 34 which may be substituted for the member 4, it is not necessary to provide a series of passageways, as I have there provided a crescent-shaped chamber 36 in the face of the fixed member 35, together with a spring-pressed check 51 carried by the rotatable member. It will be obvious that in this embodiment shown in Fig. 3, the steam will pass from chamber 38 by passageway 39 to this counterbalancing chamber 36, and so counterbalance the varying direction and amount of the load, substantially the same as in the series of chambers shown in Fig. 1.

It will be observed that in Fig. 3 and also in the lower half of Figs. 1 and 2, the passageways are all in the rotatable member, but in the upper half of Figs. 1 and 2 the passageways indicated by 21 and 23 are stationarily located and are formed in the fixed members.

Figs. 4 and 5 show details of construction, Fig. 4 representing an enlarged portion of the rotatable member 4 and fixed member 26. Fig. 5 is a plan view of a portion of member 4 to show the preferred diagonal arrangement of the chambers. It is desirable, on account of the speed of the rotating member of a rotary engine and the appreciable time which it takes for the steam to pass through the passageways in member 4 and enter the counterbalancing chambers, to lead the resultant of the counterbalancing pressure slightly ahead of the resultant of the load, and in order to do this I have formed the counterbalancing chambers (such for example as 30 31) as shown in Fig. 5. This will lead the steam slightly ahead of the rear of the piston and so compensate for the delay in exerting effective pressure in the counterbalancing chambers. In order to keep the counterbalancing chambers which are behind the piston in communication at all times with that part of the chamber 11 formed behind the piston, I have preferably spaced the passageways through the member 4 a distance apart such that the distance between centers of any two adjacent passageways will be substantially equal to the width of a cross section of a chamber, as indicated in Fig. 4. It will therefore be evident that each counterbalancing chamber behind the piston at any time will be in communication through at least one passageway with the chamber 11 behind the piston, and the pressures therein will therefore be substantially equal at all times. The counterbalancing chambers are substantially closed against escape of the counterbalancing fluid, except through the passageways which communicate with the source of fluid supply. For example, the chambers 19 and 22 in Fig. 1 are closed by the rotatable member 3, and although a very slight quantity of steam might leak beyond them, they would still be substantially closed. If desired, I may provide checks, one of which is indicated, for example, as a spring-pressed check 40 to prevent passage of any leak of steam between chamber 19 and chamber 22. I also may provide recesses 41 and 42 which may open to the atmosphere, if desired, so that any steam leaking to them will be prevented from passing beyond such escape ports and perhaps otherwise exerting an undesirable steam pressure. It will be obvious, however, that I do not confine myself to providing these auxiliary devices.

It will be observed from the foregoing that I have provided constructions by which a counterbalancing effect may be produced either by the fluid which exerts the load or which is independent thereof, and whether the direction and amount of the radial load is constant or whether both vary or only one varies.

While I have particularly referred to steam as the motor and counterbalancing fluid, my invention is applicable to engines operated by steam, and to explosive as well as expansion engines, and in other apparatus where other fluids or liquids are used.

From the foregoing it will be seen that my invention is applicable to different structures where there is normally friction resulting from the rotation of one member upon or in respect to another member, and whether the friction results from the rotation of a loaded shaft (as the shaft 5 or 6 Fig. 1) in its bearings, or additionally where friction would otherwise result from the wear of the shafts causing the members carried by the shafts to be brought frictionally against other parts of the structure.

While I have described above one embodiment of my invention, it will be obvious that it may be embodied in widely varied forms and is applicable to widely varying conditions, and I therefore do not limit myself to the applications or to the particular constructions or arrangements which I have described and illustrated.

What I claim is:

1. In combination, a rotatable member, a fixed bearing member, means for exerting a compressed-fluid radial load upon said rotatable member, means applying said compressed-fluid between said members in opposition to said load, and means automatically causing the radial direction of the resultants of the load and counterbalancing pressure to travel forward at a less speed than that of said rotatable member.

2. In combination, a rotatable member, a fixed bearing member, means for exerting a compressed-fluid radial load upon said rotatable member, means applying said compressed-fluid between said members in opposition to said load, and means automatically causing the radial direction of the resultants of the load and counterbalancing pressure to travel forward at substantially one-half the speed of said rotatable member.

3. In combination, a rotatable member, a fixed bearing member, means for exerting a compressed-fluid radial load upon said rotatable member, means applying said compressed-fluid between said members in opposition to said load, and means automatically causing the radial direction of the resultants of the load and counterbalancing pressure to travel forward at a less speed than that of said rotatable member, said changes being automatically controlled by said rotatable member.

4. In combination, a rotatable member, a fixed bearing member, means for exerting a compressed-fluid radial load upon said rotatable member, means applying said compressed-fluid between said members in opposition to said load, and means automatically causing the radial direction of the resultants of the load and counterbalancing pressure to travel forward at a less speed than that of said rotatable member, and means for relieving both said pressures.

5. In combination, a rotatable member, a fixed bearing member, means for exerting a compressed-fluid radial load upon said rotatable member, means applying said compressed-fluid between said members in opposition to said load, means automatically causing the radial direction of the resultants of the load and counterbalancing pressure to travel forward at substantially one-half the speed of said rotatable member, said changes being automatically controlled by said rotatable member, and means for exhausting said load and counterbalancing pressure, all said operations taking place during one revolution of said rotatable member.

6. In combination, a rotatable member, a fixed radial bearing for the same, means for exerting a fluid pressure on such an area of said rotatable member as results in a load toward said bearing, means for exerting said fluid pressure between said member and bearing on an area of said rotatable member in opposition to said load, and means for simultaneously increasing both said areas.

7. In combination, a rotatable member, a fixed radial bearing for the same, means for exerting a fluid pressure on such an area of said rotatable member as results in a load toward said bearing, means for exerting said fluid pressure between said member and bearing on an area of said rotatable member in opposition to said load, means for simultaneously increasing both said areas, and means for afterward relieving said fluid pressure therefrom, during one revolution of said rotatable member.

8. In combination, a rotatable member, a fixed radial bearing for the same, means for exerting a fluid pressure on such an area of said rotatable member as results in a load toward said bearing, means for exerting said fluid pressure between said member and bearing on an area of said rotatable member in opposition to said load, and means controlled by the movement of said rotatable member for simultaneously increasing both said areas and afterward relieving said fluid pressure therefrom during one revolution of said rotatable member.

9. In combination a rotatable member, a fixed radial bearing for the same, means for exerting a fluid pressure on such an area of said rotatable member as results in a load toward said bearing, means for exerting said fluid pressure between said member and bearing on an area of said rotatable member in opposition to said load, and means for simultaneously increasing both said areas during one revolution of said rotatable member, and means for relieving said fluid pressures thereafter during said revolution.

10. In combination, a rotatable member, a fixed radial bearing for the same, means for exerting a compressed-fluid pressure on such an area of said rotatable member as results in a load toward said bearing, means for exerting said fluid pressure between said member and bearing on an area of said rotatable member in opposition to said load, and means for simultaneously increasing both said areas.

11. In combination, a casing, a rotatable member therein forming one side of a chamber in said casing, a fixed radial bearing for said rotatable member, means for admitting a compressed-fluid to said chamber and on such an area of said rotatable member as results in a load toward said bearing, means for exerting said fluid pressure between said member and bearing on an area of said rotatable member in opposition to said load, and means for simultaneously increasing both said areas.

12. In combination, a casing, a rotatable member therein forming one side of a chamber in said casing, a fixed radial bearing for said rotatable member, means for admitting a compressed fluid to said chamber and on such an area of said rotatable member as results in a load toward said bearing, means for exerting said fluid pressure between said member and bearing on an area of said rotatable member in opposition to said load, means for simultaneously increasing both said areas, and means for relieving said fluid pressures from said areas.

13. In combination, a rotatable member, a fixed radial bearing for the same, means for exerting a compressed-fluid pressure on such an area of said rotatable member as results in a load toward said bearing, means for increasing such area, a series of substantially non-communicating spaces between said bearing and rotatable member, and means for introducing said compressed-fluid into said spaces in succession as said area is increased, said spaces being so located that the resultant pressure therein upon said rotatable member opposes the resultant pressure on said rotatable member toward said bearing.

14. In combination, a rotatable member, a fixed radial bearing for the same, means for exerting a compressed-fluid pressure on such an area of said rotatable member as results in a load toward said bearing, means for increasing such area, a series of substantially non-communicating spaces between said bearing and rotatable member, and means comprising a passageway to each chamber opened by said rotatable member as it advances for introducing said compressed fluid into said spaces in succession as said area is increased, said spaces being so located that the resultant pressure therein upon said rotatable member opposes the resultant pressure on said rotatable member toward said bearing.

15. In combination, a rotatable member, a fixed radial bearing for the same, means for exerting a compressed fluid pressure on such an area of said rotatable member as results in a load toward said bearing, means for increasing such area, a series of substantially non-communicating spaces between said bearing and rotatable member, and means for introducing said compressed fluid into said spaces in succession as said area is increased, said spaces being so located that the resultant pressure therein upon said rotatable member opposes the resultant pressure on said rotatable member toward said bearing, and means for relieving said fluid pressure from both said member and said spaces.

16. In combination, a rotatable member, a fixed radial bearing for the same, means for exerting a compressed-fluid pressure on such an area of said rotatable member as results in a load toward said bearing, means for increasing such area, a series of substantially non-communicating spaces in the face of said fixed bearing member and closed by said rotatable member, and means for introducing said compressed fluid into said spaces in succession as said area is increased, said spaces being so located that the resultant pressure therein upon said rotatable member opposes the resultant pressure on said rotatable member toward said bearing.

17. In combination, a rotatable member, a fixed radial bearing for the same, means for exerting a compressed-fluid pressure on such an area of said rotatable member as results in a load toward said bearing, means for exerting said fluid pressure between said member and bearing on an area of said rotatable member in opposition to said load, and means for rotating said member by the same fluid as exerts said load and thereby simultaneously increasing both said areas.

18. In combination, a rotatable member having axial extensions which form a bearing surface at each side of said member, a fixed radial bearing for such extension, means for exerting a fluid pressure on such an area of said rotatable member as results in a load toward said fixed bearings, means for exerting said fluid pressure between said fixed bearing and each extension on such areas of said rotatable member as result in pressures in opposition to said load, and means for simultaneously increasing all said areas.

19. In combination, a casing, a rotatable member therein the circumference of which is separated from said casing, a fixed radial bearing for said rotatable member, a piston extending from said rotatable member, a steam chamber in said casing formed in part by a portion of the circumference of said rotatable member and said piston, means for introducing steam into said chamber and thereby exerting a load on said rotatable member toward said bearing and on the piston to rotate the same, means for introducing steam from said chamber between said rotatable member and bearing on an area of said rotatable member to oppose said load, said rotatable member being arranged so that the movement of the same increases both said areas in the direction of rotation, and means for thereafter relieving said pressures, all said operations occurring during one revolution of said rotatable member.

20. In combination, a rotatable member having axial extensions which form a bearing surface at each side of said member, a fixed radial bearing for each extension, means for exerting a fluid pressure on such an area of said rotatable member as results in a load toward said fixed bearings, means for exerting said fluid pressure between said fixed bearing and each extension on such areas of said rotatable member as result in pressures in opposition to said load, and means operated by the rotation of said member for simultaneously increasing all said areas, and means for afterward relieving said pressures.

21. In combination, a rotatable member, a fixed radial bearing for the same, means for exerting a steam pressure to rotate said member and on such an area of said rotatable member as results in a load toward said bearing, means for increasing such area in the direction of rotation as said member advances, a series of substantially non-communicating spaces between said bearing and rotatable member, passageways for the fluid which rotates said member to said spaces and operated by the rotation of said member as it advances for introducing steam which rotates said member into said spaces in succession, said passageways being so arranged that at least one of said passageways is in communication with each space at all times during said increase of area, said spaces being so located that the advancing resultant pressure therein upon said rotatable member opposes the advancing resultant pressure on said rotatable member which is exerted toward said bearing, and means for exhausting the steam which exerts said pressures.

22. In combination, a rotatable member, a fixed bearing member, means for exerting a compressed-fluid radial load upon said rotatable member, means applying said compressed fluid between said members in opposition to said load, means automatically changing the amount and radial direction of the load and counterbalancing pressure whereby the fluid which exerts said load also opposes said load during such changes, said changes being automatically controlled by said rotatable member.

23. In combination, a rotatable member, a fixed bearing member, means for exerting a compressed-fluid radial load upon said rotatable member, means applying said compressed fluid between said members in opposition to said load, means automatically changing the amount and radial direction of the load and counterbalancing pressure whereby the fluid which exerts said load also opposes said load during such changes, said changes being automatically controlled by said rotatable member at each revolution.

24. In combination, a casing, a rotatable member therein, a piston carried by said rotatable member, means for introducing a compressed fluid into said casing to act on one side of said piston and thereby rotate said member and to exert a radial fluid-pressure load on one side of said rotatable member, a fixed bearing member, a series of chambers in the face of one of said members and closed by said other member, and means operated by said rotatable member for opening communication between said casing and said chambers in succession, said chambers being located to oppose the changing direction and amount of the radial load upon said rotatable member.

25. In combination, a casing, a rotatable member therein, a piston carried by said rotatable member, means for introducing a compressed fluid into said casing to act on one side of said piston and thereby rotate said member and to exert a radial fluid-pressure load on one side of said rotatable member, a fixed bearing member, a series of chambers in the face of said fixed member and closed by said rotatable member, and means operated by said rotatable member for opening communication between said casing and said chambers in succession, said chambers being located to oppose the changing direction and amount of the radial load upon said rotatable member.

26. In combination, a casing, a rotatable member therein, a piston carried by said rotatable member, means for introducing a compressed fluid into said casing to act on one side of said piston and thereby rotate said member and to exert a radial fluid-pressure load on one side of said rotatable member, a fixed bearing member, a series of chambers in the face of said fixed member arranged successively around a portion of the circumference of the same and closed by said rotatable member, and means operated by said rotatable member for opening communication between said casing and said chambers in succession, said chambers being located to oppose the changing direction and amount of the radial load upon said rotatable member.

27. In combination, a casing, a rotatable member therein, a piston carried by said rotatable member, means for introducing a compressed fluid into said casing to act on one side of said piston and thereby rotate said member and to exert a radial fluid-pressure load on one side of said rotatable member, a fixed bearing member, a series of chambers in the face of said relatively fixed member and closed by said rotatable member, and a series of ports in said rotatable member for opening communication between said casing and said chambers in succession, said chambers being located to oppose the changing direction and amount of the radial load upon said rotatable member.

28. In combination, a rotatable member, a relatively fixed member, means for exerting a radial fluid-pressure load upon said rotatable member which varies in direction, means for introducing a counterbalancing fluid-pressure between said members in advance of said load as the direction changes and maintaining the same in opposition to said load.

29. In combination with the fixed and movable members of a bearing and with means resulting in a load upon one side of the bearing during each rotation, of means providing a counterbalancing pressure, and means for accumulating such load and counterbalancing pressure after the first application of such pressure.

30. In a bearing having fixed and rotatable members, means whereby a pressure is applied to one side of the center of the bearing to rotate the rotatable member, and a chamber at the same side of the axis of rotation, means for admitting fluid pressure thereto to counterbalance the motor pressure, and means for thereafter accumulating both said pressures.

31. In a bearing a rotatable member having a central web and annular extensions at opposite sides thereof, a relatively fixed member inclosing the rotatable member and recessed to receive the said extensions, chambers at opposite sides of the web between the faces of the fixed and rotatable members, means to introduce a counterbalancing fluid into such chambers, and means for increasing the area acted upon by such counterbalancing fluid.

32. In combination, a rotatable piston, a rotatable member, a fixed radial bearing for the same, means for exerting a fluid pressure on such an area of said rotatable member as results in a load toward said bearing, means for exerting said fluid pressure between said member and bearing on an area of said rotatable member in opposition to said load, and means for simultaneously increasing both said areas.

33. In combination, a rotatable member, a fixed member, means for exerting a radial fluid-pressure load upon said rotatable member which varies in direction, means for introducing a counterbalancing fluid-pressure between said members in advance of said load as the direction changes and maintaining the same in opposition to said load.

34. In a device of the class described, the combination with a casing, of a fixed member longitudinally therein, a rotary member surrounding said fixed member, a projection on said rotary member, means for confining a fluid under pressure in said casing behind said projection between it and a fixed point of the casing to drive said rotary member, and means for admitting the said fluid under pressure between said members from said fixed point to said projection at all points of the revolution the area to which it is admitted being at all times substantially equal to the area of the outer surface of said rotary member between said fixed point and projection and being so proportioned as to equalize the pressure.

35. In a device of the class described, the combination with a casing, of a fixed member longitudinally therein cylindrical in form, a rotary member having a cylindrical portion surrounding said fixed member and provided with perforations, separate chambers being formed between said members throughout the circumference substantially equal to the exposed outer area of said rotary member, a projection on said rotary member, means for confining a fluid under pressure in said casing behind said projection between it and a fixed point of the casing whereby the rotary member will be driven and the axial pressure on its outer surface will be equalized by the counteracting pressure within the chambers.

36. In a device of the class described, the combination with a cylindrical casing and means for supplying a fluid under pressure, of a rotary member therein carried by a central shaft, annular extensions upon opposite sides of said member, a fixed member having annular recesses in which said extensions fit closely leaving the central outer part of the rotary member exposed to said fluid under pressure, chambers formed between said fixed and rotary members extending beneath said annular extensions beyond said exposed surface the said outer member being formed with passages leading from its outer exposed surface to said chambers, whereby the fluid under pressure will be admitted to said chambers and exert its force outwardly upon the inner surface of said extensions.

37. In combination, a rotatable member, a relatively fixed member, diagonal partitions on said fixed member forming separated chambers between said members, the said rotary member having passages therethrough communicating with said chambers, and means for exerting a radial fluid pressure load upon said rotatable member which varies in area and direction.

38. In combination, a rotatable member, a relatively fixed member, partitions on said fixed member extending bodily about as well as along the axis of said member forming separated chambers between said members, the said rotary member having passages therethrough communicating with said chamber, and means for exerting a radial fluid pressure load upon said rotatable member which varies in area and direction.

39. In combination, a rotatable member, a relatively fixed member, diagonal partitions on said fixed member spaced equal distances apart forming separated chambers between said members, the said rotary member having passages therethrough communicating with said chambers, spaced apart distances equal to the width of said chambers and at the advance end of said diagonal partitions, and means for exerting a radial fluid pressure load upon said rotatable member which varies in area and direction.

40. In a device of the class described, the combination with a casing, of a rotary member having a cylindrical portion fitting therein and having in its outer surface a central longitudinal recess to which fluid under pressure is admitted and in its under surface a corresponding recess extending beyond the end of said outer recess, a passage therethrough connecting said recesses, and a central fixed bearing member fitting within said cylindrical portion.

41. In a device of the class described, the combination with a casing of a rotary member having a cylindrical outer surface including an annular extension on each side fitting therein, the said member being provided with a central longitudinal fluid pressure-chamber in its outer surface extending part way into said annular extensions and the under surfaces of said extensions being provided with chambers corresponding in radial position to the outer chamber, but extending beyond the ends thereof, and the said extensions having passages therethrough joining said chambers and a fixed bearing member containing oppositely disposed cylindrical portions fitting within said annular extensions.

42. In a device of the class described, the combination with a casing having a cylindrical opening therein, of a rotary member within said casing having annular extensions beyond the edge of said casing, fixed bearing members secured to said casing upon opposite sides and having annular grooves to fit and receive said extensions, means for supplying fluid under pressure to the outer surface of said rotary member at its central portion throughout a part of the outer circumference, and means for admitting said fluid under pressure beneath said extensions to such an area as to balance said pressure on the outer circumference.

43. In combination, a rotatable member, a fixed bearing member, means for exerting a fluid pressure load toward said bearing member, upon an area of said rotatable member, means for applying a fluid under pressure upon an area of said rotatable member between said members in opposition to said load, and means for increasing both said areas.

44. In combination, a rotatable member, a fixed member, means for exerting a fluid pressure load upon an area of said rotatable member toward said fixed member, means for exerting a fluid pressure load in opposition thereto upon said rotatable member between said members, means for increasing the area acted upon by said first mentioned load and varying the amount of said opposing load.

In testimony whereof I affix my signature in presence of two witnesses.

GERARDUS POST HERRICK.

Witnesses:
CHARLES E. FOSTER,
ARTHUR L. BRYANT.